G. W. CLEMENT.
PACKING.
APPLICATION FILED MAR. 4, 1912. RENEWED FEB. 4, 1913.
1,120,181.
Patented Dec. 8, 1914
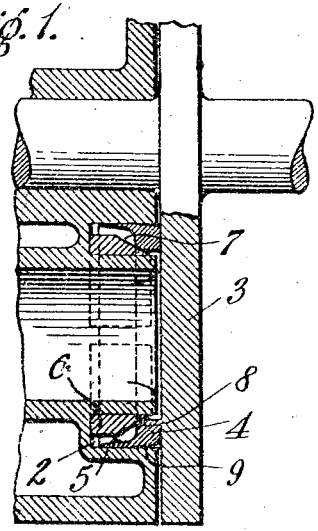
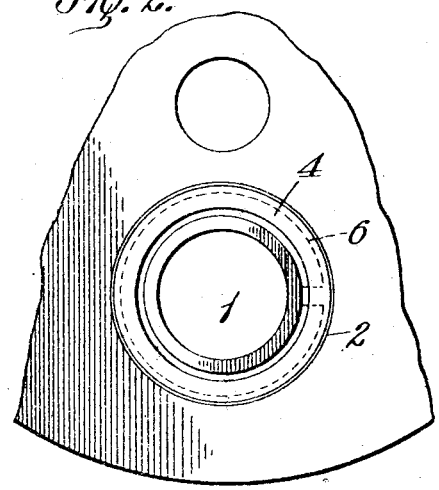
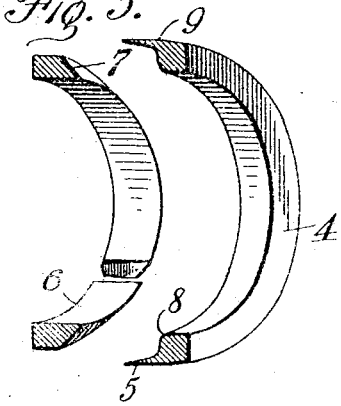
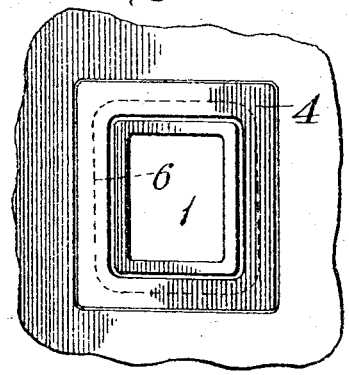
Witnesses
Chas. W. Stauffiger
Anna M. Dorr
Inventor
George W. Clement,
By
Attorney

UNITED STATES PATENT OFFICE.

GEORGE W. CLEMENT, OF DETROIT, MICHIGAN.

PACKING.

1,120,181.     Specification of Letters Patent.     Patented Dec. 8, 1914.

Application filed March 4, 1912, Serial No. 681,531. Renewed February 4, 1913. Serial No. 746,123.

*To all whom it may concern:*

Be it known that I, GEORGE W. CLEMENT, a citizen of the United States of America, residing at Detroit, in the county of Wayne and State of Michigan, have invented certain new and useful Improvements in Packing, of which the following is a specification, reference being had therein to the accompanying drawings.

This invention relates to packing for use around ports or like places to prevent leakage between a member in which the port is formed and an opposing member, and especially when the two members have relative movements as in a slide or rotary valve construction. The packing is also adapted for use in places of high temperature, as, for example, in explosive engines, and is so disposed as to wear evenly and maintain a close joint with the surface against which it bears.

The invention consists in the matters hereinafter set forth, and more particularly pointed out in the appended claims.

In the drawings, Figure 1 is a view in longitudinal section through a ported wall provided with packing that embodies features of the invention, shown in relation to an opposing member; Fig. 2 is a plan view of the port and packing; Fig. 3 shows details of construction of a packing and expansion ring; and Fig. 4 is a plan view showing a modification of a packing for ports that are not circular.

As shown herein as preferred form of one type of the invention, a circular port 1 is surrounded by an annular channel shown at 2 with a moving member 3 traversing or moving past the mouth of the port. A packing ring 4 is disposed in the channel with its outer face bearing against the face of the moving member 3. The body of the ring is of substantial thickness and has an inwardly projecting thin marginal flange 5 with spring edge yieldingly contacting with the outer periphery of the channel 2. The ring is so disposed in relation to the channel that gas, steam or fluid under pressure in the port finds entrance to the channel through the clearance space as indicated by the arrows in Fig. 1 and forces the ring outwardly against the member 3 while at the same time it expands the thin rim or flange 5 that is arranged to have a close sliding fit with the adjacent wall of the channel, and under pressure effectually shuts off escape of the fluid past the ring.

To aid in seating the ring on the moving member a spring member 6 may be employed. In preferred form and more particularly with a circular port and consequent annular packing, the spring member is a split ring having a beveled face 7 adapted to bear against a rounded shoulder 8 of the ring 4 and therefore crowd the latter forward when the spring member expands, the latter being inserted in position when contracted and backing against the base of the channel to force the ring 4 forward.

As indicated in Fig. 4, the port may be square, oblong or of other form, in which case the packing may correspond to the contour of the port and the spring member may likewise be an expansible strip of the same configuration. Or any spring means may be used to project the packing, if desired, although the packing is effective without this mechanical means for projecting the same.

In the form shown in Fig. 1, if the member 3 be rotary in its motion past the port, it tends to revolve the packing in the channel thereby wearing the latter evenly and in any form of construction, the packing presents a face which maintains a close fit with the moving member with which it is in sliding contact. When worn, the packing is readily replaced. Owing to this construction it may be readily water jacketed as indicated in Fig. 1 and whether so cooled or not, may be subjected to high temperature without losing its efficiency or otherwise deteriorating.

As a further detail of construction, the outer face 9 of the packing may be slightly tapered or relieved from the base of the flange 5 to the wearing face of the packing, to allow the latter to readily accommodate itself to the channel and bear evenly against the moving member, if the same became slightly warped.

The proportions of the cross-sectional conformation may be varied and this is of importance as the width of the resilient rim may be increased so that the frictional or braking effect of the same on the side of the channel neutralizes to a greater or less extent, as may be desired, the end thrust of the packing against any moving member due to the pressure of fluid behind the body of the packing.

Obviously changes in the details of construction may be made without departing from the spirit of my invention and I do not care to limit myself to any particular form or arrangement of parts.

What I claim is:

1. The combination with members moving in relation to each other and substantially in sliding-contact, one of which has an opening adjacent the contacting face of the other member, of a continuous packing member inset in the ported member around the opening thereof and adapted to be forced into sliding contact with the companion member and into yielding conformity to the retaining face of the ported member transversely to the plane of contact with the companion member by pressure of fluid in the opening.

2. The combination with members moving in relation to each other and substantially in sliding-contact, one of which has an opening adjacent the contacting face of the other member, of a continuous packing member inset in the ported member around the opening thereof and adapted to be forced into contact with the companion member and into yielding conformity to a face of the retaining face of the ported member transversely to the plane of contact with the companion member by pressure of fluid in the opening, and resilient means for forcing the packing member into contact with the other member independently of fluid pressure in the opening.

3. The combination with members moving in relation to each other and substantially in sliding contact, one of which has an opening traversed by the contacting face of the other member and surrounded by a packing receiving channel, of a continuous packing member in the groove adapted to be forced into and held in sliding engagement with the contacting face of the other member and into yielding conformity with a retaining face of the channel transversely to the face of the other member by pressure of fluid in the opening.

4. The combination with members moving in relation to each other and substantially in sliding contact, one of which has an opening adjacent the contacting face of the other member surrounded by a packing receiving channel, of a continuous packing member in the groove adapted to be forced into and held in sliding engagement with the other member and into yielding conformity with a retaining face of the channel transversely to the face of the other member by pressure of fluid in the opening, and a resilient member in the channel adapted to force the packing member against the other member independently of the action of fluid under pressure in the opening.

5. The combination with members in sliding engagement and substantially in contact with each other, one of which has an opening traversed by the moving face of the other member and surrounded by a packing receiving channel, of a continuous packing strip in the channel adapted to be forced outwardly against the other member by fluid under pressure entering the channel from the opening and laterally into yielding conformity to the wall of the channel under such fluid pressure.

6. The combination with members having surfaces in sliding and substantially contacting engagement, one of the members having a port in such surface surrounded by a packing retaining recess, of a continuous strip in said recess having a body adapted to be projected by fluid entering the recess from the port under pressure, into frictional contact with the surface of the other member and a resilient flange adapted to be forced by such fluid pressure into contact with the wall of the recess to seal the latter, the flange being transverse to the face of the other member against which the strip is projected.

7. The combination with members having surfaces in sliding and substantially contacting engagement, one of the members having a port in such surface surrounded by a packing retaining recess, of a continuous strip in said recess having a body adapted to be projected by fluid entering the recess from the port under pressure, into frictional contact with the surface of the other member, a resilient flange adapted to be forced transversely to the surface of the strip body by such fluid under pressure into contact with the wall of the recess to seal the latter, and a resilient member adapted to hold the body of the strip in contact with the opposing surface of the other member independently of the fluid pressure.

8. The combination with members having surfaces in sliding and substantially contacting engagement, one of the members having a port in such surface surrounded by a packing retaining recess, of an endless strip seated in said recess, a body portion thereof adapted to be forced by fluid entering the recess under pressure into frictional engagement with the opposing surface of the other member, and a flange on the body having a thin, resilient marginal portion transverse to the bearing face of the strip adapted to be forced by fluid under pressure into frictional engagement with the wall of the recess to seal the latter against passage of fluid around the strip.

9. The combination with members having surfaces in sliding and substantially contacting engagement, one of the members having a port in such surface surrounded by a packing retaining recess, of an endless strip seated in said recess, a body portion thereof adapted to be forced by fluid entering the recess under pressure into frictional engagement with the opposing surface of the other member, a flange on the body having a thin resilient marginal portion transverse to the bearing face of the strip adapted to be forced by fluid under pressure into frictional engagement with the wall of the recess to seal the latter against passage of fluid around the strip, and an expansible member in the recess for projecting the body of the strip independently of the action of fluid under pressure.

10. A continuous packing member for a port through a member having movable contact with a companion member that sweeps across the port, which is adapted to be expanded into yielding conformity with the portions of the ported member which it engages and to be forced transversely to the direction of expansion of the packing member into contact with the companion member by a pressure of fluid in the port.

In testimony whereof I affix my signature in presence of two witnesses.

GEORGE W. CLEMENT.

Witnesses:
C. R. STICKNEY,
ANNA M. DORR.